(12) United States Patent
Agrawal et al.

(10) Patent No.: US 10,097,345 B2
(45) Date of Patent: Oct. 9, 2018

(54) SECURE HASH ALGORITHM IN DIGITAL HARDWARE FOR CRYPTOGRAPHIC APPLICATIONS

(71) Applicant: PeerNova, Inc., San Jose, CA (US)

(72) Inventors: Arvind Agrawal, San Jose, CA (US); Gangesh Kumar Ganesan, Mountain View, CA (US)

(73) Assignee: PEERNOVA, INC., San Jose, CA (US)

( * ) Notice: Subject to any disclaimer, the term of this patent is extended or adjusted under 35 U.S.C. 154(b) by 154 days.

(21) Appl. No.: 15/098,130

(22) Filed: Apr. 13, 2016

(65) Prior Publication Data
US 2017/0302440 A1   Oct. 19, 2017

Related U.S. Application Data

(60) Provisional application No. 62/147,512, filed on Apr. 14, 2015.

(51) Int. Cl.
*G06F 21/00* (2013.01)
*H04L 9/06* (2006.01)
*H04L 9/32* (2006.01)

(52) U.S. Cl.
CPC .......... *H04L 9/0643* (2013.01); *H04L 9/3239* (2013.01)

(58) Field of Classification Search
None
See application file for complete search history.

(56) References Cited

U.S. PATENT DOCUMENTS

| 7,299,355 | B2 * | 11/2007 | Qi | H04L 9/0643 380/229 |
| 7,600,131 | B1 * | 10/2009 | Krishna | G06F 9/3879 370/389 |
| 7,620,821 | B1 * | 11/2009 | Grohoski | G06F 9/3851 380/1 |
| 8,000,469 | B2 * | 8/2011 | Buer | H04L 9/0643 380/29 |
| 8,351,600 | B2 * | 1/2013 | Resch | G06F 11/1004 380/28 |
| 8,977,859 | B2 * | 3/2015 | Ross | G06F 21/64 713/176 |
| 9,317,719 | B2 * | 4/2016 | Gueron | G06F 21/72 |
| 9,882,878 | B2 * | 1/2018 | Luo | H04L 63/029 |

(Continued)

OTHER PUBLICATIONS

Khan, Esam; El-Kharashi, M. Watheq; Gebali, Fayez; Abd-El-Barr, Mostafa. Design and Performance Analysis of a Unified, Reconfigurable HMAC-Hash Unit. IEEE Transactions on Circuits and Systems i: Regular Papers. vol. 54, Issue: 12. Pub. Date: 2007. https://ieeexplore.ieee.org/stamp/stamp.jsp?tp=&arnumber=4378219.*

(Continued)

*Primary Examiner* — Jeremiah Avery
(74) *Attorney, Agent, or Firm* — Fenwick & West LLP

(57) ABSTRACT

Technology, implemented in digital hardware, software, or combination thereof, for completing Secure Hash Algorithm (SHA-2) computation with generating one new hash value at each clock cycle is described. The technology includes: using synchronous logic to store the computed values every alternate clock and combinational logic to process multiple rounds of SHA in each clock; completing hash calculation in unrolled modes; using efficient adders for most 32-bit adders to improve performance.

10 Claims, 10 Drawing Sheets

(56) References Cited

U.S. PATENT DOCUMENTS

| | | | | |
|---|---|---|---|---|
| 2010/0104098 A1* | 4/2010 | Kim | ................ | H04L 9/3239 |
| | | | | 380/269 |
| 2010/0146296 A1* | 6/2010 | Kim | ................ | H04L 9/3239 |
| | | | | 713/189 |
| 2013/0195266 A1* | 8/2013 | Fischer | ............. | H04L 9/003 |
| | | | | 380/44 |
| 2014/0108786 A1* | 4/2014 | Kreft | ................ | G06F 21/71 |
| | | | | 713/156 |
| 2015/0186139 A1* | 7/2015 | Wolrich | ......... | G06F 9/30036 |
| | | | | 712/208 |

OTHER PUBLICATIONS

Fout, Nathaniel; Ma, Kwan-Liu. An Adaptive Prediction-Based Approach to Lossless Compression of Floating-Point Volume Data. IEEE Transactions on Visualization and Computer Graphics. vol. 18, Issue: 12. Pub. Date: 2012. https://ieeexplore.ieee.org/stamp/stamp.jsp?tp=&arnumber=6327234.*

Wang, Min; Wu, Jun; Shi, Sai Feng; Luo, Chong; Wu, Feng. Fast Decoding and Hardware Design for Binary-Input Compressive Sensing. IEEE Journal on Emerging and Selected Topics in Circuits and Systems. vol. 2, Issue: 3. Pub. Date: 2012. https://ieeexplore.ieee.org/stamp/stamp.jsp?tp=&arnumber=6331566.*

\* cited by examiner

Similar 1-bit adders for bits 2 to 30

| Stage 2 | $\sigma_1$ (w(t-2)) | W(t-7) | $\sigma_0$ (w (t-15)) | W (t-16) | Comments |
|---|---|---|---|---|---|
| W0 | | | | | 4 Byte Merkle Root |
| W1 | | | | | Time |
| W2 | | | | | Difficulty |
| W3 | | | | | Nonce |
| W4 | | | | | 32'h8000_0000 |
| W5 | | | | | 32'h0000_0000 |
| W6 | | | | | 32'h0000_0000 |
| W7 | | | | | 32'h0000_0000 |
| W8 | | | | | 32'h0000_0000 |
| W9 | | | | | 32'h0000_0000 |
| W10 | | | | | 32'h0000_0000 |
| W11 | | | | | 32'h0000_0000 |
| W12 | | | | | 32'h0000_0000 |
| W13 | | | | | 32'h0000_0000 |
| W14 | | | | | 32'h0000_0000 |
| W15 | | | | | 32'h0000_0280 |
| W16 | W14 = 0 | W9 = 0 | W1 | W0 | |
| W17 | W15 | W10 = 0 | W2 | W1 | |
| W18 | W16 | W11 = 0 | W3 | W2 | |
| W19 | W17 | W12 = 0 | W4 | W3 | |
| W20 | W18 | W13 = 0 | W5 = 0 | W4 | |
| W21 | W19 | W14 = 0 | W6 = 0 | W5 = 0 | |
| W22 | W20 | W15 | W7 = 0 | W6 = 0 | |
| W23 | W21 | W16 | W8 = 0 | W7 = 0 | |
| W24 | W22 | W17 | W9 = 0 | W8 = 0 | |
| W25 | W23 | W18 | W10 = 0 | W9 = 0 | |
| W26 | W24 | W19 | W11 = 0 | W10 = 0 | |
| W27 | W25 | W20 | W12 = 0 | W11 = 0 | |
| W28 | W26 | W21 | W13 = 0 | W12 = 0 | |
| W29 | W27 | W22 | W14 = 0 | W13 = 0 | |
| W30 | W28 | W23 | W15 | W14 = 0 | |
| W31 | W29 | W24 | W16 | W15 | |
| W32 | W30 | W25 | W17 | W16 | |

TABLE 1

FIG. 9

| Stage 3 | $\sigma_1$ (w(t-2)) | W(t-7) | $\sigma_0$ (w(t-15)) | W (t-16) | Comments |
|---|---|---|---|---|---|
| W0 | | | | | H2 |
| W1 | | | | | H2 |
| W2 | | | | | H2 |
| W3 | | | | | H2 |
| W4 | | | | | H2 |
| W5 | | | | | H2 |
| W6 | | | | | H2 |
| W7 | | | | | H2 |
| W8 | | | | | 32'h8000_0000 |
| W9 | | | | | 32'h0000_0000 |
| W10 | | | | | 32'h0000_0000 |
| W11 | | | | | 32'h0000_0000 |
| W12 | | | | | 32'h0000_0000 |
| W13 | | | | | 32'h0000_0000 |
| W14 | | | | | 32'h0000_0000 |
| W15 | | | | | 32'h0000_0100 |
| W16 | W14 = 0 | W9 = 0 | W1 | W0 | |
| W17 | W15 | W10 = 0 | W2 | W1 | |
| W18 | W16 | W11 = 0 | W3 | W2 | |
| W19 | W17 | W12 = 0 | W4 | W3 | |
| W20 | W18 | W13 = 0 | W5 | W4 | |
| W21 | W19 | W14 = 0 | W6 | W5 | |
| W22 | W20 | W15 | W7 | W6 | |
| W23 | W21 | W16 | W8 | W7 | |
| W24 | W22 | W17 | W9 = 0 | W8 | |
| W25 | W23 | W18 | W10 = 0 | W9 = 0 | |
| W26 | W24 | W19 | W11 = 0 | W10 = 0 | |
| W27 | W25 | W20 | W12 = 0 | W11 = 0 | |
| W28 | W26 | W21 | W13 = 0 | W12 = 0 | |
| W29 | W27 | W22 | W14 = 0 | W13 = 0 | |
| W30 | W28 | W23 | W15 | W14 = 0 | |
| W31 | W29 | W24 | W16 | W15 | |
| W32 | W30 | W25 | W17 | W16 | |

TABLE 2

FIG. 10

SECURE HASH ALGORITHM IN DIGITAL HARDWARE FOR CRYPTOGRAPHIC APPLICATIONS

CROSS REFERENCE TO RELATED APPLICATION

This application claims the benefit of U.S. Provisional Application No. 62/147,512, filed Apr. 14, 2015, which is incorporated by reference herein in its entirety.

BACKGROUND OF THE INVENTION

Standard specified hash algorithms can be used to generate digests (hash values) of messages. The digests are used to detect whether messages have been changed since the digests have been generated. In last few years, there have been some research and trend toward hardware implementation of security algorithms for speeding up the security process.

Since the Secure Hash Algorithm (SHA) functions are one-way and chances of collision are very rare, the hash value calculation changes substantially for minor changes to the input file. The Secure Hash Algorithm 2 (SHA-2) was further developed to generate a unique 256-bit (SHA-256), 224-bit (SHA-224), or 512-bit (SHA-512) message digest for any message.

Previous implementation of the SHA-2 in software has been quite slow as each round of the SHA-2 computations takes multiple instructions and clock cycles. Although single instruction, multiple data (SIMD) computation was created for some reduced instruction set computing (RISC) processors to speed up the SHA-2 processing, it still takes hundreds of clock cycles to generate an SHA-2 value. Most hardware implementations of the SHA-2 are slow as each SHA-2 hash calculation takes 64 clocks to process data, leading to a new message digest being generated every 64 clock cycles and making the design extremely slow.

There is an increasing demand for data processing invoking the SHA-2 algorithm than before. There is a need to create a novel system design to speed up implementations of SHA-2 algorithm. Furthermore, hardware implementations of SHA-2 may be tailored to specific applications.

SUMMARY OF THE INVENTION

Existing implementations of SHA or SHA-2 have been irrelevant towards the cryptographic mining applications, where most of the input message digest remains the same for long periods of the time and only a small portion of the input message digest changes each clock cycle. Hence, a special digital hardware is described herein to speed up the hash processing. The technology disclosed herein provides a digital hardware of SHA-2, which may maximize or improve the performance of the algorithm using an unrolled hash computation circuit.

In an unrolled 1× mode, 48 expansion logics/circuits/modules and 64 compression logics/circuits/modules may be deployed, and one hash value is generated every clock cycle after a latency of 64 cycles. Further, hash values are generated in subsequent clock cycles with no gap.

Similarly, in an unrolled 2× mode, 24 expansion logics/circuits/modules and 32 compression logics/circuits/modules may be deployed, and one hash value is generated every clock cycle after a latency of 32 cycles. Further, hash values are generated in subsequent clock cycles with no gap.

Furthermore, since there are a number of adders (e.g., 32-bit adders) in the SHA-256 calculations for computing new values of working variables a to h and of message schedules $W_j$, many of these adders are replaced with 3-input 2-output Carry-Save Adders (CSA).

Furthermore, in various applications, many values of the message schedules $W_j$ are either constants or zeroes, and this feature may be utilized to reduce the logic area and power.

In an example, an 80-byte block header is processed in 3 stages. The first 64-bytes of the 80-byte header is processed in the software version of the SHA-2, and the result is sent to a hardware module, such as application-specific integrated circuits (ASICs) or field programmable gate arrays (FPGAs), as the initial value. The balance of 16-bytes may be sent to a hardware module as 4 bytes of Merkle Root, 4 bytes of Timestamp, 4 byte Difficulty and 4 byte Nonce. The hardware module processes and pads these 16-byte messages. Once an SHA-2 hash is calculated in Stage 2, the resultant hash is used as the message input to Stage 3 to calculate double SHA-2 values.

One embodiment disclosed herein is a digital circuit for generating a hash of a message using a secure hashing algorithm. The digital circuit includes a plurality of expansion modules, each expansion module configured to receive at least a portion of the message and generate first and second expanded message blocks based on an expansion function applied to the portion of the message. The digital circuit also includes a plurality of pipelined compression modules, each compression module corresponding to an expansion module and configured to receive the first and second expanded message blocks generated by the corresponding expansion logic and a plurality of initial hash variables associated with a first round of compression. Each compression module includes first compression logic configured to receive the plurality of initial hash variables and a first expanded message block and generate a plurality of intermediary working variables including a first intermediary working variable, a second intermediary working variable, and a third intermediary working variable, by applying a compression function to the plurality of initial hash variables and the first expanded message block, the plurality of intermediary working variables associated with a second round of compression. Each compression module also includes second compression logic coupled to the first compression logic and configured to receive the second expanded message block and the second and the third intermediary working variables, and generate a plurality of output hash variables associated with a third round of compression by applying the compression function to the second expanded message block and the second and the third intermediary working variables, the output hash variables provided as input to a next compression module in the plurality of pipelined compression modules.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGs." herein), of which:

FIG. 9 depicts Table 1 that describes the first 32 rounds of $W_j$ calculations for Stage 2 of a cryptocurrency application that is implemented in hardware.

FIG. 10 depicts Table 2 that describes the first 32 rounds of $W_j$ calculations for Stage 3 of a cryptocurrency application which is implemented in hardware.

DETAILED DESCRIPTION

Figure 1:
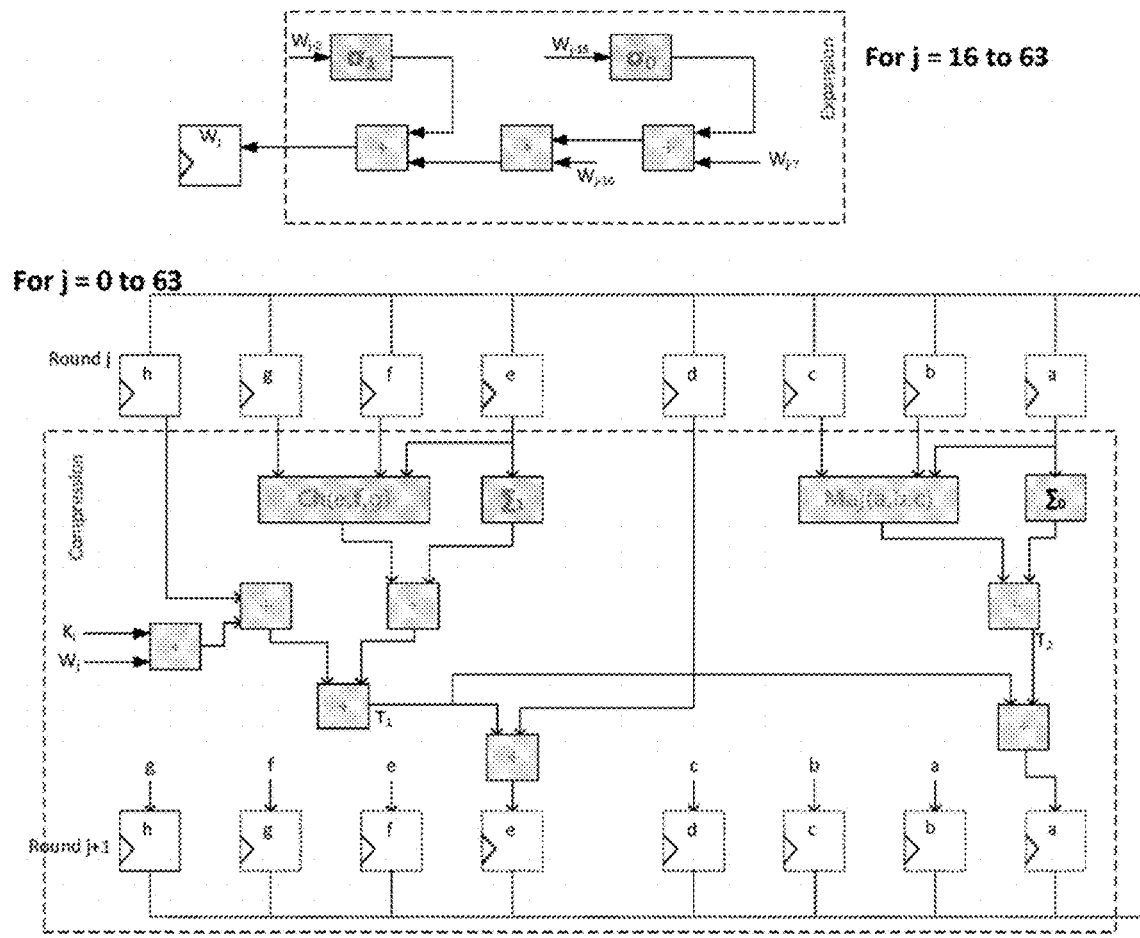
FIG. 1 depicts an example diagram of an implementation of an SHA-2 cycle round.

While various embodiments of the technology have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The technology described herein provides efficient implementation of Secure Hash Algorithm 2 (SHA-2) with optimal resources for best performance. The technology unrolls expansion and compression computations across a number of logics in a pipeline, and is able to generate a hash value in one clock cycle. An unrolled implementation described herein works for various implementations of SHA-2, including various cryptographic applications, such as needed in networking, financial, military, cryptocurrencies (Bitcoins), or other applications. One or more 3-input 2-output carry-save adders (CSA) can also be used in all applications of SHA-2. For instance, 32-bit 3-input 2-output CSAs may be used.

A processing of one block of a message by an SHA-2 hash computation stage is described as follows. For illustration purpose, SHA-256 is used as an example. Other SHA-2 algorithms, for example, but not limited to, SHA-224, SHA-384, SHA-512, SHA-512/224, SHA-512/256, and other algorithms can be applied as well.

An input may comprise a message that is divided into multiple segments, each with the same bit length. For illustration purposes, an input comprising a 512-bit message is considered. The input may be further divided into 16 segments of 32-bits each, $M_0$ to $M_{15}$. In another example, the input may comprise a set of 32-bit hash values $H_0$ to $H_7$ generated at an earlier time.

There are eight 32-bit registers or working variables a, b, c, d, e, f, g and h, with initial values set to $H_0$ to $H_7$, respectively. The 16 segments of message $M_0$ to $M_{15}$ may be used to prepare a message schedule, $\{Wj\}$:

$$W_j = M_j \quad 0 \leq j \leq 15$$

$$W_j = \sigma_1(W_{j-2}) + W_{j-7} + \sigma_0(W_{j-15}) + W_{j-16} \quad 16 \leq j \leq 63 \qquad \text{Function A}$$

where j is a round number from 0 to 63.

$$\sigma_0(x) = ROT_7(x) \oplus ROT_{18}(x) \oplus SHF_3(x)$$

$$\sigma_1(x) = ROT_{17}(x) \oplus ROT_{19}(x) \oplus SHF_{10}(x)$$

where $ROT_n(x)$ denotes circular rotation of x by n positions to the right, $SHF_n(x)$ denotes right shifting of x by n positions, the operator $\oplus$ stands for bitwise XOR, and the operator+stands for addition mod $2^{32}$.

For j=0 to 63, contents of variables a, b, c, d, e, f, g and h can be calculated as follows:

$$T_1 = h_j + \sum_1 (e_j) + Ch(e_j, f_j, g_j) + K_i + W_i$$

$$T_2 = \sum_0 (a_j) + Maj(a_j, b_j, c_j)$$

$$h_{j+1} = g_j$$

$$f_{j+1} = e_j$$

$$d_{j+1} = c_j$$

$$b_{j+1} = a_j$$

$$g_{j+1} = f_j$$

$$e_{j+1} = d_j + T_1$$

$$c_{j+1} = b_j$$

$$a_{j+1} = T_1 + T_2$$

$$Ch(x, y, z) = (x \text{ AND } y) \oplus (\neg x \text{ AND } z) \qquad \text{Function B}$$

$$Maj(x, y, z) = (x \text{ AND } y) \oplus (x \text{ AND } z) \oplus (y \text{ AND } z) \qquad \text{Function C}$$

$$\sum_0 (x) = ROT_2(x) \oplus ROT_{13}(x) \oplus ROT_{22}(x) \qquad \text{Function D}$$

$$\sum_1 (x) = ROT_6(x) \oplus ROT_{11}(x) \oplus ROT_{25}(x) \qquad \text{Function E}$$

where
and where AND stands for bitwise AND operation, stands for bitwise complement, and $K_i$ denotes a sequence of predefined 32-bit constants as defined in the Federal Information Processing Standards (PIPS) PUB 180-4.

The aforementioned equations/computations may be realized by a digital hardware, shown in FIG. 1. Referring to FIG. 1, a digital circuit may comprise an expansion circuit/module and a compression circuit/module. An expansion circuit may implement equations presented above with respect to preparing a message schedule $\{W_j\}$, and a compression circuit may implement equations presented above with respect to preparing intermediate variables. Designs of an SHA-2 for cryptographic applications may comprise 1 round of expansion logic and 1 round of compression logic that may be looped over 64 times to generate a hash value. Hence, each hash value is generated every 64 clock cycles. This implementation can result in small and compact logic, but the computational time becomes quite slow.

Unrolled 2× Mode

Figure 2:
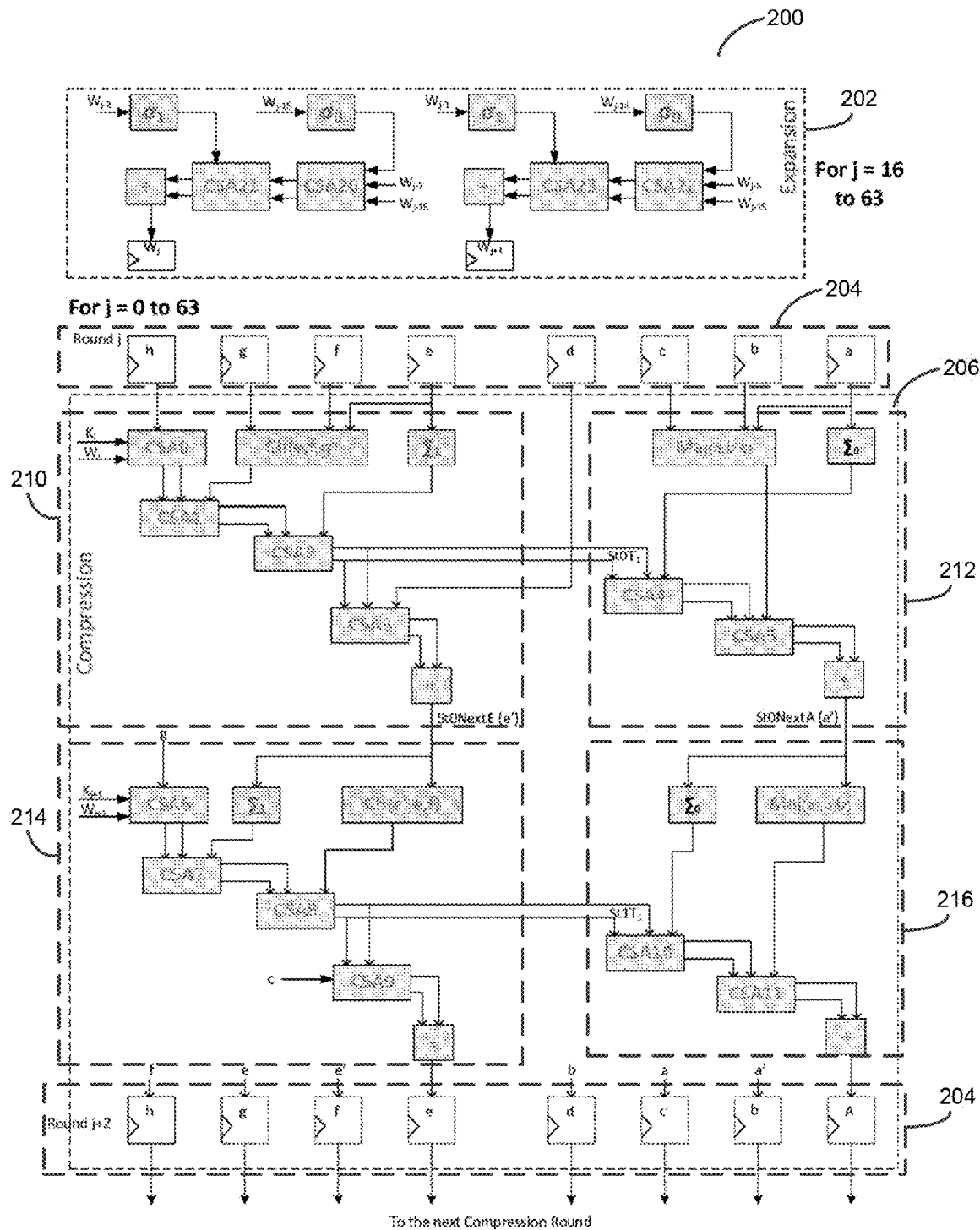
FIG. 2 depicts an example architectural block diagram of SHA-2 in an unrolled 2× mode; in this example, SHA-256 is used for illustration, where 2 rounds of SHA-256 are calculated in each clock cycle.

FIG. 2 illustrates a digital circuit 200 for implementing SHA-2 in an unrolled 2× mode. For illustration purpose, the implementation described herein considers SHA-256, but the technology can be applied to other SHA-2 algorithms. The digital circuit 200 includes expansion module 202, input registers 204, and compression module 206. The digital circuit 200 may be replicated and serialized into a single pipeline for 64 rounds of SHA-256 calculations. The single pipeline generates a hash of a 512-bit message every clock cycle. The following discussion describes the operation of the digital circuit 200 during one round of SHA-256 calculations.

The expansion module 202 generates the expanded message blocks $\{W_j$ and $W_{j+1}\}$ based on the 512-bit message to be hashed. The 512-bit messages is divided into 16 segments of 32-bits each, $M_0$ to $M_{15}$. For the first 16 clock cycles, where j is greater than or equal to zero and less than 16, the expansion module 202 generates the message blocks $\{W_j$ and $W_{j+1}\}$ based on $\{M_j$ and $W_{j-1}\}$. For the subsequent 16 clock cycles, where j is greater than or equal to 16 and less than 63, the expansion module 202 takes as input $\{W_{j-1}, W_{j-2}, W_{j-6}, W_{j-7}, W_{j-14}, W_{j-2}, W_{j-15}, W_{j-16}\}$. The expansion module 202 processes these inputs according to Function A above to generate the expanded message blocks $\{W_j$ and $W_{j-1}\}$ at each clock cycle.

The input registers 204 store the working hash variables (also referred to herein as "working variables" and "hash variables") provided as input to the compression module 206. Each of the input registers 204 stores a 32-bit word. In one embodiment, at j=0, the input registers 204 store initial working variables that are computed by taking the first thirty-two bits of the fractional parts of the square roots of the first eight prime numbers. For j>0, the input registers 204 store working hash variables generated by the compression module 206 in a previous round, j−2.

The compression module 206 takes as input the expanded message blocks $\{W_j$ and $W_{j+1}\}$ generated by the expansion module 202, two constants $K_j$ and $K_{j+1}$, and working variables in the input registers 204. The compression module 206 processes those inputs according to the SHA compression Functions B-E above to generate hash values that are stored in the input registers 204 for the j+2 round of compression. In operation, the compression module 206 processes the working variables a, b, c, d, e, f, g and h of round j (stored in input registers 204) to calculate the intermediate working variables of a, b, c, d, e, f, g and h of round j+1. The calculated values of a, b, c, d, e, f, g and h of round j+1 are not stored in synchronous logic. Instead, the intermediate values of a, b, c, d, e, f, g and h of round j+1 are directly used to calculate the working variables a, b, c, d, e, f, g and h of round j+2.

To process the working variables a, b, c, d, e, f, g and h of round j in such a manner, the compression module 206 includes preliminary compression logic having combinational logic 210 and combinational logic 212 and secondary compression logic having combinational logic 214 and combinational logic 216. The preliminary compression logic generates the intermediary working variables of round j+1 based on the working variables a, b, c, d, e, f, g and h of round j. The secondary compression stage generates the working variables a, b, c, d, e, f, g and h of round j+2 based on both the intermediary working variables of round j+1 and the working variables a, b, c, d, e, f, g and h of round j.

The combinational logic 210 takes as input working variables h, g, f, e, and d of round j, the expanded message block $W_j$, and the constant $K_j$ and compresses those inputs to generate intermediary working variable e' of round j+1 and intermediary variable $T_1$. To compress the inputs, the combinational logic 210 includes a series of carry-save adders and functional blocks implementing Functions B and E above. The resulting intermediary working variable e' is an input into combinational logic 214, and the intermediary variable $T_1$ is an input into combinational logic 212.

The combinational logic 212 takes as input working variables a, b, and c of round j and the intermediary variable $T_1$ generated by combinational logic 210 and compresses those inputs to generate intermediary working variable a' of round j+1. To compress the inputs, the combinational logic 212 includes a series of carry-save adders and functional blocks implementing Functions C and D above. The resulting intermediary variable a' is an input into combinational logic 216.

The combinational logic 214 takes as input working variable c and g of round j, the expanded message block $W_{j+1}$, the constant $K_{j+1}$, and the intermediary working variable e' of round j+1. The combinational logic 214 compresses those inputs to generate working variable e of round j+2 and intermediary variable $T_1$. To compress the inputs, the combinational logic 214 includes a series of carry-save adders and functional blocks implementing Functions B and E above. The resulting intermediary variable e is stored in the corresponding input register of input registers 204 for round j+2.

The combinational logic 216 takes as input the intermediary variable a' of round j+1 and intermediary variable $T_1$ generated by combinational logic. The combinational logic 216 compresses those inputs to generate working variable a of round j+2. To compress the inputs, the combinational logic 216 includes a series of carry-save adders and functional blocks implementing Functions C and D above. The resulting intermediary variable e is stored in the corresponding input register of input registers 204 for round j+2.

Figure 3:
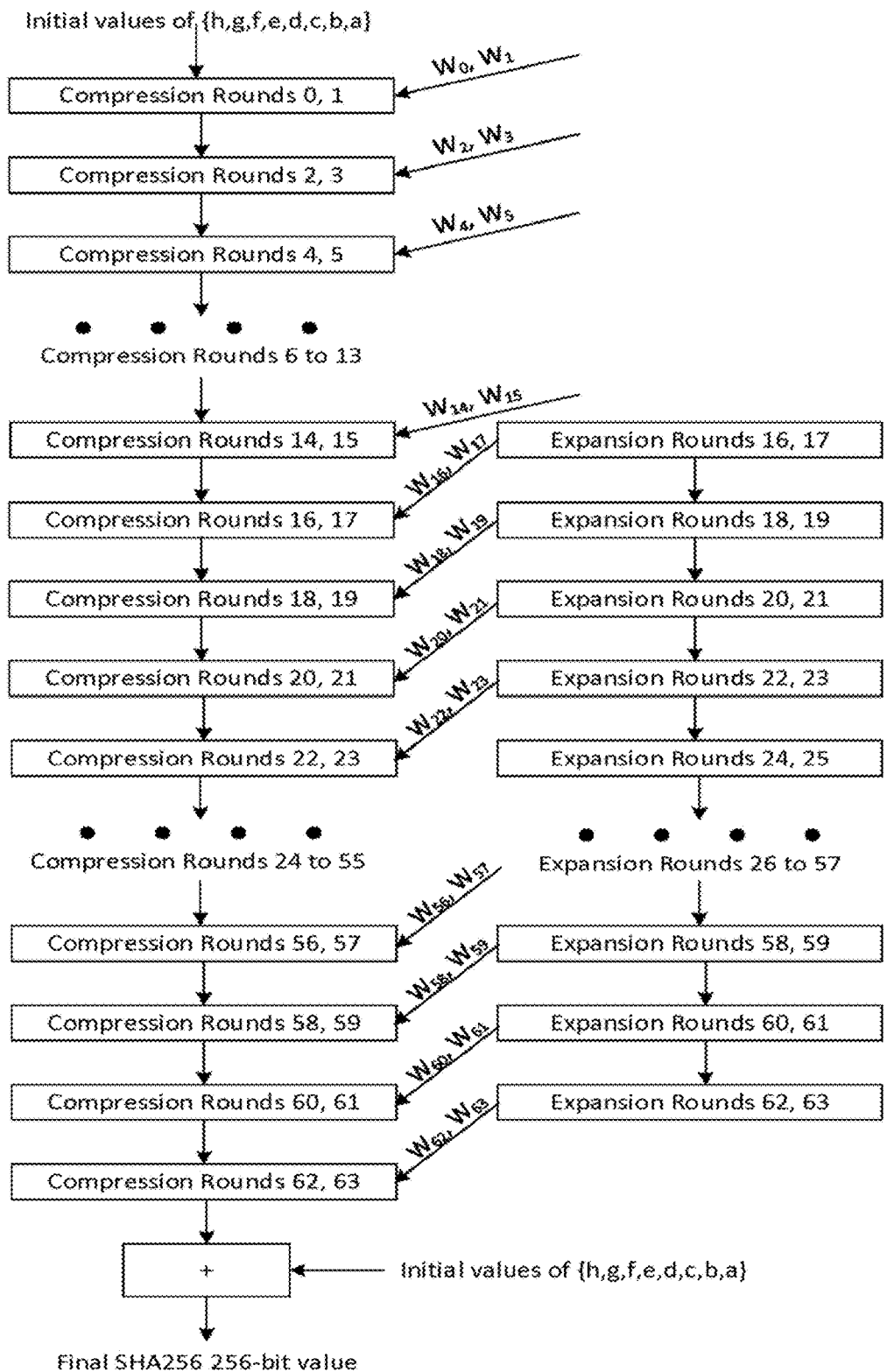
FIG. 3 depicts an example architectural block diagram of 64 rounds in an unrolled 2× mode, wherein SHA-256 is considered for illustration and all the rounds can be processed in a pipelined mechanism in a single clock cycle.

FIG. 3 shows a computational flow chart of 64 rounds of calculations using the digital circuit 200 that are completed in a single clock cycle. In particular, after the values a, b, c, d, e, f, g and h in round j+2 are calculated, they are stored in synchronous logic (flops). Then these a, b, c, d, e, f, g and h in round j+2 can be passed to the subsequent round for calculating the values a, b, c, d, e, f, g and h in round j+4. By using such an unrolled 2× mode, the logic size of the implementation may increase by about 64 times, but the advantage is that hash results can be generated every clock cycle in an unrolled 2× mode.

In the implementation described in FIG. 1, a hash result can be generated every 64 clock cycles. In the implementation in FIG. 2 and FIG. 3, a hash result can be generated every clock cycle. This kind of 2× unrolled design is extremely useful in various types of cryptographic applications, for example, financial, military, prediction, communication, trading, cryptocurrencies (e.g., Bitcoin), email exchanges, digital signature, or other applications.

In some cryptographic examples, most of the inputs to an SHA-256 engine may remain the same, and only a nonce may change. Hence the nonce can be incremented internally with a small control logic above the SHA-256 engine which can keep all the inputs the same except for the nonce. This way a new SHA-256 may be executed every clock cycle, and a new hash value may be generated every clock cycle as well. A benefit of this design is to dramatically reduce computational time in the SHA-256 implementation. For instance, in aerospace tracking and management applications, reduced computing time can allow aircrafts to quickly react to unexpected events; in cryptocurrency applications, reduced computing time can allow swift reaction to efficient currency pricing in the market.

Unrolled 1× Mode

Figure 4:
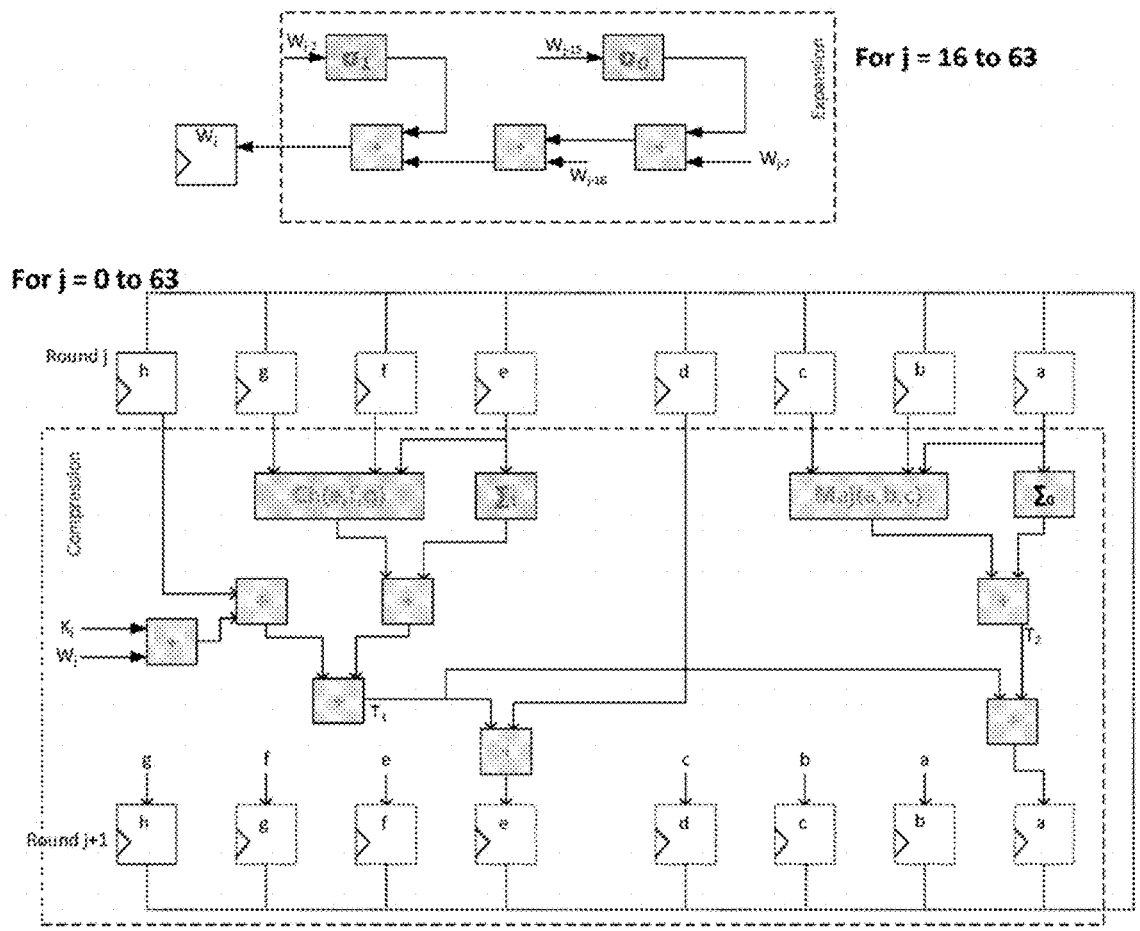
FIG. 4 depicts an example architectural block diagram of SHA-2 in an unrolled 1× mode; in this example, SHA-256 is used for illustration, where 1 round of SHA-256 is calculated in each clock cycle.

Another implementation similar to the aforementioned 2× unrolled mode is a 1× unrolled mode. FIG. 4 describes an example of internal architecture of a 1× unrolled design implementation. In each round, one new $W_j$ value is calculated. Also in each round, a value of $W_j$ may be consumed along with a value of $K_j$. The values of a, b, c, d, e, f, g and h in round j can be used to calculate the values of a, b, c, d, e, f, g and h in round j+1. After the values a, b, c, d, e, f, g and h in round j+1 are calculated, they are stored in the synchronous logic (flops) in the design. Then these a, b, c, d, e, f, g and h in round j+1 can be passed to the subsequent round below it for calculating the values a, b, c, d, e, f, g and h in round j+2. Note that the values a a, b, c, d, e, f, g and h in round j+1 may not be looped back to the same round.

Figure 5:
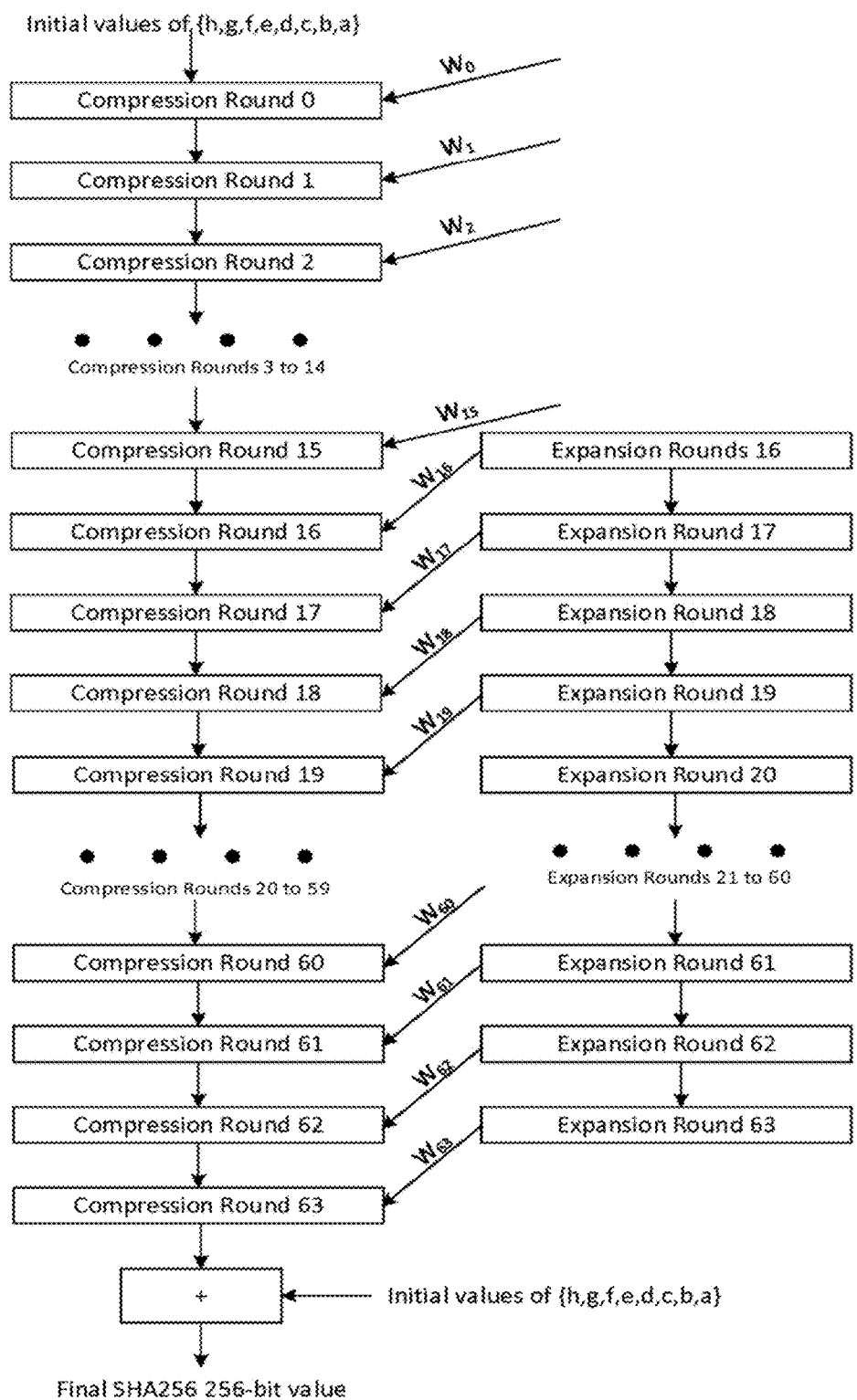
FIG. 5 depicts an example architectural block diagram of 64 rounds in an unrolled 1× mode, wherein SHA-256 is considered for illustration and all the rounds can be processed in a pipelined mechanism in a single clock cycle.

Referring FIG. 5, which shows a corresponding computational flow chart of all the 64 rounds of calculations to be competed in a single clock cycle, the system can take the results of round j+1 and send those results to the following rounds. Referring again to FIG. 4, which shows an underlying logic for unrolled 1× mode, 64 rounds of SHA-256 can be achieved in a clock cycle by duplicating the underlying logic 64 times in a single pipeline. In effect, the logic of the implementation increases by about 64 times, but hash results can be generated every clock cycle in unrolled 1× mode.

Remembering that in FIG. 1, a result can be generated every 64 clock cycles, but in contrast, examples in FIG. 4 and FIG. 5 can generate a hash result every clock cycle. This kind of 1× unrolled design implementation is extremely useful in various types of cryptographic applications, for instance, financial, military, prediction, communication, trading, cryptocurrencies (e.g., Bitcoin), email exchanges, digital signature, or other applications.

In some cryptographic applications, most of the inputs to an SHA-256 engine may remain the same and only the nonce may change. Hence the nonce can be incremented internally with small sized control logic above the SHA-256 engine which can keep all the inputs the same except for the nonce. This way a new SHA-256 can be processed every clock cycle and a new hash value can be generated every clock cycle. Since a hash value can be generated in a clock cycle rather than in 64 cycles, the technology disclosed herein dramatically reduces computational time of the SHA-256 algorithm.

Adders

Figure 6:
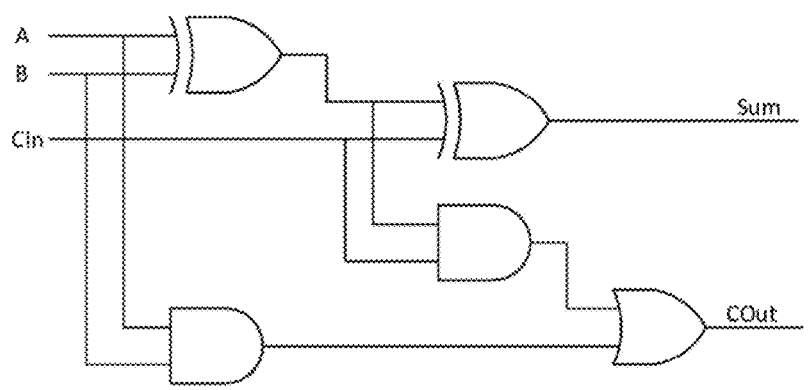
FIG. 6 depicts an example of a 1-bit 3-input 2-output carry-save adder which can be used for 32-bit adders in an unrolled 1× or 2× mode.
Figure 7:
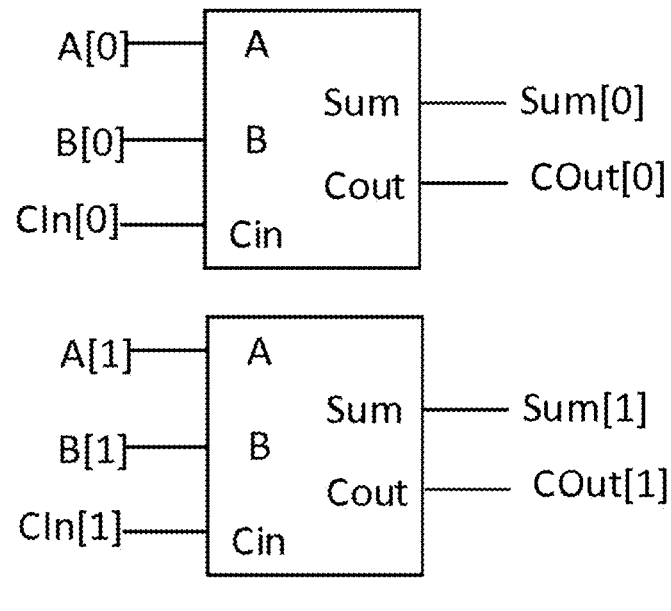
FIG. 7 depicts an example of a 32-bit carry-save adder which can be made up of 32 1-bit carry-save adders as described in FIG. 6.
Figure 7:
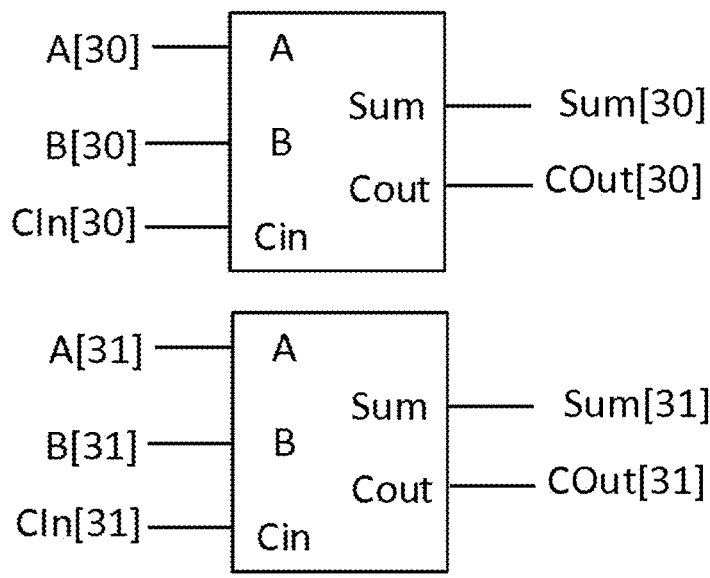

In various embodiments, 1× unrolled and 2× unrolled designs shown in FIG. 2, FIG. 3, FIG. 4, and FIG. 5 may include adders. Most adders can be implemented using Carry-Save Adders (CSA) with 3 inputs and 2 outputs. A non-limiting example of the logic architecture of a CSA is shown in FIG. 6. Furthermore, FIG. 7 depicts an example of a 32-bit CSA that can be made up of thirty two 1-bit carry-save adders as described in FIG. 6. The bits of A and B, denoted as A[O], . . . , A[31] and B[O], . . . B[31], respectively, are fed into the adders in parallel, and bitwise sums Sum[O], . . . Sum[31] and carrys COut[O], . . . , COut[31] are generated at output. These carry-save adders may operate in an extremely fast speed as they do not have Carry propagation from one 1-bit adder to the next 1-bit adder inside a 32-bit adder. The usage of these CSA may allow an SHA system to run at a faster speed in the ASICs and FPGA's compared to other types of adders, such as Ripple Carry Adder, Carry Look-Ahead Adder, Ladner-Fisher Adder, Brent-Kung adders and other adder implementations where the carry is propagated.

Logic Reduction and Optimization

SHA and its variations have been widely used in various types of cryptographic applications, for instance, financial, military, prediction, communication, trading, cryptocurrencies (e.g., Bitcoin), email exchanges, digital signature, or other applications. Some embodiments may need to perform double SHA (SHA-2) computations on the input block header structure and comparing the hash value to a predetermined difficulty value. In certain applications, many of the values in the block header may be either constant values or zeroes; such a unique feature enables hardware implementation to further consider logic optimization to reduce (or remove) the adders, combinational logic and synchronous logic which are involved in using these constant values or zeroes. The technology described herein regarding SHA-2 (e.g., SHA-224, SHA-256, SHA-384, SHA-512, SHA-512/224, SHA-512/256, or other algorithms) can be optimized to reduce the logic area and consumed power of the SHA-2 algorithm. Also since many registers in SHA-2 may operate based on 32-bits and a complete 32-bit register can toggle (or change) at the same time, the design can use multi-bit flops to reduce the power of synchronous logic.

A digital hardware development of SHA-2 for various applications where many $W_j$ values are either constant or zero values may be utilized to reduce the logic area and power consumption of the design. A block header can be processed in 3 stages. For illustration purpose, an example of a 80-byte block header and SHA-256 algorithm is described in the following, but the technology can be generalized to other sizes of block headers and SHA-2 algorithms. The first 64-byte of the 80-byte header can be processed in the software version of the SHA-256 and the result can be sent to the ASICs or FPGAs as the initial value. The balance of 16-bytes may be sent to the hardware device as 4 bytes of Merkle Root, 4 bytes of Timestamp, 4 byte Difficulty and 4 byte Nonce. The hardware device can take these 16 byte messages and pad them. Once an SHA-256 is calculated in stage 2, then the resultant 256-bit is used as the message input to the stage 3 to calculate the double SHA-256.

Figure 8:
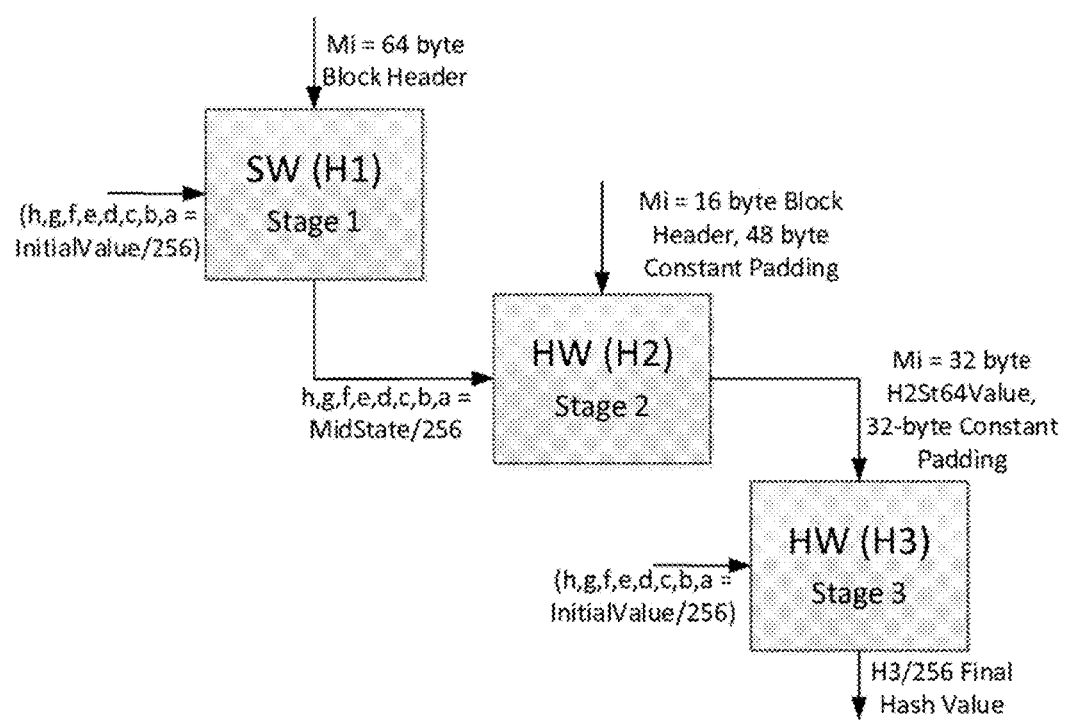
FIG. 8 depicts an example architectural block diagram concept where three stages for block header processing are shown.

Referring to FIG. 8, the flow chart shows an example how a 80-byte block header can be split in 2 stages. The Stage I processes the first 64-byte of the block header and generates the H1 value. For many applications, these 64-bytes may be same for long periods of time and processing. Hence, the Stage I can be done in software and does not need specialized digital hardware to process it. The 256-bit hash value results of Stage I and balance of 16-bytes can be sent to the Stage 2 for processing in hardware (or in a combination of hardware and software). The 256-bit hash value of Stage 2 can be sent to Stage 3 for double hashing as needed for various applications. The hash value of the Stage 3 may be the final hash value used for determining if the hash value satisfies the Difficulty criteria (which is a degree of how difficult in breaking the system) needed in many kinds of applications. In many applications (e.g., military, financial, currency, Bitcoin, or other applications) which employ digital hardware to speed up the hash processing, Stage 2 and Stage 3 may be preferably performed in digital hardware. Nevertheless, Stages 1-3 each can be realized by software, by hardware, or by combination thereof.

FIG. 9 depicts Table 1 that describes the first 32 rounds of $W_j$ calculations for Stage 2 of a cryptocurrency application that is implemented in hardware.

As shown in Table 1, W16 calculations during Stage 2 may include four $W_j$ being used, which are the W0, W1, W9 and W14. Out of these W9 and W14 may always be zero. Hence the updated formula for W16 is W16=$\sigma_0$ (W$_1$)+W$_0$. This feature may reduce a circuit size by 2 adders and some more logic to calculate $\sigma_1$ (W14).

Similarly during the Stage 2, W17 calculations, W10 may always be zero. Hence the updated formula for W17 is W17=$\sigma_1$ (W$_{15}$)+$\sigma_0$ (W$_2$)+W$_1$. This can reduce a circuit size by 1 adder.

Similarly during the Stage 2, W18 calculations, W11 may always be zero. Hence the updated formula for W18 is W18=$\sigma_1$ (W$_{16}$)+$\sigma_0$ (W$_3$)+W$_2$. This can reduce a circuit size by 1 adder.

Similarly during the Stage 2, W19 calculations, W122 may always be zero. Hence the updated formula for W19 is W19=$\sigma_1$ (W$_{17}$)+$\sigma_0$ (W$_4$)+W$_3$. This can reduce a circuit size by 1 adder.

Similarly during the Stage 2, W20 calculations, W13 and W5 may always be zero. Hence the updated formula for W20 is W20=$\sigma_1$ (W$_{18}$)+W$_4$. This can reduce a circuit size by 2 adders and some more logic to calculate $\sigma_0$ (W$_5$).

Similarly during the Stage 2, W21 calculations, W14, W6 and W5 may always be zero. Hence the updated formula for W21 is W20=$\sigma_1$ (W$_{19}$). This can reduce a circuit size by 3 adders and some more logic to calculate $\sigma_0$ (W$_6$).

Similarly during the Stage 2, W22 calculations, W7 and W6 may always be zero. Hence the updated formula for W22 is W22=$\sigma_1$ (W$_{20}$)+W$_{15}$. This can reduce a circuit size by 2 adders and some more logic to calculate $\sigma_0$ (W$_6$).

Similarly during the Stage 2, W23 calculations, W8 and W7 may always be zero. Hence the updated formula for W23 is W23=$\sigma_1$ (W$_{21}$)+W$_{16}$. This can reduce a circuit size by 2 adders and some more logic to calculate $\sigma_0$ (W$_8$).

Similarly during the Stage 2, W24 calculations, W9 and W8 may always be zero. Hence the updated formula for W23 is W24=$\sigma_1$ (W$_{22}$)+W$_{17}$. This can reduce a circuit size by 2 adders and some more logic to calculate $\sigma_0$ (W$_9$).

Similarly during the Stage 2, W25 calculations, W10 and W9 may always be zero. Hence the updated formula for W23 is W25=$\sigma_1$ (W$_{23}$)+W$_{is}$. This can reduce a circuit size by 2 adders and some more logic to calculate $\sigma_0$ (W$_{10}$).

Similarly during the Stage 2, W26 calculations, W11 and W10 may always be zero. Hence the updated formula for W26 is W26=$\sigma_1$ (W$_{24}$)+W$_{19}$. This can reduce a circuit size by 2 adders and some more logic to calculate $\sigma_0$ (W$_{11}$).

Similarly during the Stage 2, W27 calculations, W12 and W11 may always be zero. Hence the updated formula for W27 is W27=$\sigma_1$ (W$_{25}$)+W$_{20}$. This can reduce a circuit size by 2 adders and some more logic to calculate $\sigma_0$ (W$_{12}$).

Similarly during the Stage 2, W28 calculations, W13 and W12 may always be zero. Hence the updated formula for W28 is W28=$\sigma_1$ (W$_{26}$)+W$_{21}$. This can reduce a circuit size by 2 adders and some more logic to calculate $\sigma_0$ (W$_{13}$).

Similarly during the Stage 2, W29 calculations, W14 and W13 may always be zero. Hence the updated formula for is W29=$\sigma_1$ (W$_{27}$)+W$_{22}$. This can reduce a circuit size by 2 adders and some more logic to calculate $\sigma_0$ (W$_{14}$).

Similarly during the Stage 2, W30 calculations, W14 may always be zero. Hence the updated formula for W30 is W30=$\sigma_1$ (W$_{28}$)+W$_{23}$+$\sigma_0$ (W$_{15}$). This can reduce a circuit size by 1 adder.

FIG. 10 depicts Table 2 that describes the first 32 rounds of $W_j$ calculations for Stage 3 of a cryptocurrency application which is implemented in hardware.

As shown in Table 2, during the Stage 3, WI 6 calculations, the 4 $W_j$'s being used may include W0, W1, W9 and W14. Out of these, W9 and W14 may always be zero. Hence the updated formula for W16 is W16=$\sigma_0$ (W$_1$)+W$_0$. This can reduce a circuit size by 2 adders and some more logic to calculate $\sigma_1$ (W$_{14}$).

Similarly during the Stage 3, W17 calculations, W10 may always be zero. Hence the updated formula for W17 is W17=$\sigma_1$ (W$_{15}$)+$\sigma_0$ (W$_2$)+W$_1$. This can reduce a circuit size by 1 adder.

Similarly during the Stage 3, W18 calculations, W11 may always be zero. Hence the updated formula for W18 is W18=$\sigma_1$ (W$_{16}$)+$\sigma_0$ (W$_3$)+W$_2$. This can reduce a circuit size by 1 adder.

Similarly during the Stage 3, W19 calculations, W12 may always be zero. Hence the updated formula for W19 is W19=$\sigma_1$ (W$_{17}$)+$\sigma_0$ (W$_4$)+W$_3$. This can reduce a circuit size by 1 adder.

Similarly during the Stage 3, W20 calculations, W13 may always be zero. Hence the updated formula for W20 is W20=$\sigma_1$ (W$_{18}$)+$\sigma_0$ (W$_5$)+W$_4$. This can reduce a circuit size by 1 adder.

Similarly during the Stage 3, W21 calculations, W14 may always be zero. Hence the updated formula for W21 is W21=$\sigma_1$ (W$_{19}$)+$\sigma_0$ (W$_6$)+W$_5$. This can reduce a circuit size by 1 adder.

Similarly during the Stage 3, W24 calculations, W9 may always be zero. Hence the updated formula for W24 is W24=$\sigma_1$ (W$_{22}$)+$\sigma_0$ (W$_{17}$)+W$_8$. This can reduce a circuit size by 1 adder and some more logic to calculate $\sigma_0$ (W$_9$).

Similarly during the Stage 3, W25 calculations, W10 and W9 may always be zero. Hence the updated formula for W25 is W25=$\sigma_1$ (W$_{23}$)+W$_{18}$. This can reduce a circuit size by 2 adders and some more logic to calculate $\sigma_0$ (W$_{10}$).

Similarly during the Stage 3, W26 calculations, W11 and W10 may always be zero. Hence the updated formula for W26 is W26=$\sigma_1$ (W$_{24}$)+W$_{19}$. This can reduce a circuit size by 2 adders and some more logic to calculate $\sigma_0$ (W$_{11}$).

Similarly during the Stage 3, W27 calculations, W12 and W11 may always be zero. Hence the updated formula for W27 is W27=$\sigma_1$ (W$_{25}$)+W$_{20}$. This can reduce a circuit size by 2 adders and some more logic to calculate $\sigma_0$ (W$_{12}$).

Similarly during the Stage 3, W28 calculations, W13 and W12 may always be zero. Hence the updated formula for W28 is W28=$\sigma_1$ (W$_{26}$)+W$_{21}$. This can reduce a circuit size by 2 adders and some more logic to calculate $\sigma_0$ (W$_{13}$).

Similarly during the Stage 3, W29 calculations, W14 and W13 may always be zero. Hence the updated formula for W29 is W29=$\sigma_1$ (W$_{27}$)+W$_{22}$. This can reduce a circuit size by 2 adders and some more logic to calculate $\sigma_0$ (W$_{14}$).

Similarly during the Stage 3, W30 calculations, W14 may always be zero. Hence the updated formula for W30 is W30=$\sigma_1$ (W$_{28}$)+W$_{23}$+$\sigma_0$ (W$_{15}$). This can reduce a circuit size by 1 adder.

During a round of expansion, an SHA-2 circuit may need to maintain 16 registers (each 32-bit wide) to save the 16 $W_j$ values which may be used in this round and then passed forward to next rounds. As shown in Table 1 and Table 2, many of the $W_j$ values are either constant or zeroes. Hence the logic can be further optimized to use less registers in places when the values are constant. This logic reduction can save hundreds of registers and save both area and power.

Another technical feature disclosed herein is that some synchronous logic in the design which stores all the intermediate values of the working variables a, b, c, d, e, f, g and h for all the 64 rounds in Stage 2 and Stage 3 may be 32-bit registers. Furthermore, some or all of these registers toggle or change values at the same time. Hence multi-bit flops for these registers can be used. These multi-bit flops are smaller in design compared to 32 individual single bit flops. Moreover, these multi-bit flops may consume less power, which is a significant benefit in many applications. In some designs, standard flops can be employed.

Although the above steps show method of various implementations in accordance with an example, a person of ordinary skill in the art will recognize many variations based on the teaching described herein. The steps may be completed in a different order. Steps may be added or deleted. Some of the steps may comprise sub-steps. Many of the steps may be repeated as often as is beneficial to the platform.

Each of the examples as described herein can be combined with one or more other examples. Further, one or more components of one or more examples can be combined with other examples.

Reference is made to the following claims which recite combinations that are part of the present disclosure, including combinations recited by multiple dependent claims dependent upon multiple dependent claims, which combinations will be understood by a person of ordinary skill in the art and are part of the present disclosure.

While preferred examples of the present invention have been shown and described herein, it will be obvious to those skilled in the art that such examples are provided by way of example only. It is not intended that the invention be limited by the specific examples provided within the specification. While the invention has been described with reference to the aforementioned specification, the descriptions and illustrations of the examples herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the examples of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A digital circuit for generating a hash of a message using a secure hashing algorithm, the digital circuit comprising:
   a plurality of expansion circuits, each expansion circuit configured to receive at least a portion of the message and generate first and second expanded message blocks based on an expansion function applied to the portion of the message;
   a plurality of pipelined compression circuits, each compression circuit corresponding to an expansion circuit and configured to receive the first and second expanded message blocks generated by the corresponding expansion circuit and a plurality of initial hash variables associated with a first round of compression, said each compression circuit comprising:
      first compression logic configured to receive the plurality of initial hash variables and a first expanded message block and generate a plurality of intermediary working variables including a first intermediary working variable, a second intermediary working variable, and a third intermediary working variable, by applying a compression function to the plurality of initial hash variables and the first expanded message block, the plurality of intermediary working variables associated with a second round of compression; and
      second compression logic coupled to the first compression logic and configured to receive the second expanded message block and the second and the third intermediary working variables, and generate a plurality of output hash variables associated with a third round of compression by applying the compression function to the second expanded message block and the second and the third intermediary working variables, the output hash variables provided as input to a next compression module in the plurality of pipelined compression modules.

2. The digital circuit of claim 1, wherein the first compression logic and the second compression logic operate in the same clock cycle to process the plurality of initial hash variables to generate the output hash variables.

3. The digital circuit of claim 1, wherein the first compression logic comprises:
   first combinational logic configured to receive a first subset of the initial hash variables and the first expanded message block and generate the first and the second intermediary working variables of the plurality of intermediary working variables by applying a first combinatorial function to the first subset and the first expanded message block, and
   second combinational logic configured to receive the first intermediary working variable and a second subset of the initial hash variables and generate the third intermediary working variable of the plurality of intermediary working variables by applying a second combinatorial function to the first intermediary working variable and the second subset of the initial hash variables, the second subset of the initial hash variables including different initial hash variables relative to first sub set.

4. The digital circuit of claim 3, wherein the second compression logic comprises:
   third combinational logic configured to receive a third subset of the plurality of initial hash variables, the second expanded message block, and the second intermediary working variable, and generate a first of the plurality of output hash variables by applying the first combinatorial function to the third subset of the plurality of initial hash variables, the second expanded message block, and the second intermediary working variable, and
   fourth combinational logic configured to receive a fourth subset of the plurality of initial hash variables and the third intermediary working variable and generate a second of the plurality of output hash variables by applying the second combinatorial function to the fourth subset of the plurality of initial hash variables and the third intermediary working variable.

5. The digital circuit of claim 2, wherein the first combinational logic comprises a plurality of carry-save adders for implementing the first combinatorial function.

6. The digital circuit of claim 2, wherein the second combinational logic comprises a plurality of carry-save adders for implementing the second combinatorial function.

7. The digital circuit of claim 1, further comprising a different set of registers coupled to each of the plurality of pipelined compression modules, the set of registers storing the plurality of initial hash variables.

8. The digital circuit of claim 1, wherein the secure hashing algorithm (SHA) comprises one or more of: SHA-2, SHA-224, SHA-256, SHA-384, SHA-512, SHA-512/224, and SHA-512/256.

9. The digital circuit of claim 1, wherein the plurality of expansion circuits comprise 48 expansion modules.

10. The digital circuit of claim 1, wherein the plurality of compression circuits comprise 64 compression modules.

* * * * *